United States Patent [19]
Veldkamp

[11] 4,410,237
[45] Oct. 18, 1983

[54] METHOD AND APPARATUS FOR SHAPING ELECTROMAGNETIC BEAMS

[75] Inventor: Wilfrid B. Veldkamp, Lexington, Mass.

[73] Assignee: Massachusetts Institute of Technology, Cambridge, Mass.

[21] Appl. No.: 191,006

[22] Filed: Sep. 26, 1980

[51] Int. Cl.³ .............................................. G02B 5/18
[52] U.S. Cl. ................................. 350/320; 350/162.2
[58] Field of Search ..................... 350/162.17, 162.18, 350/162.2, 162.23, 162.24, 320

[56] References Cited

U.S. PATENT DOCUMENTS

| 3,407,294 | 10/1968 | Hill | 350/320 |
| 3,843,239 | 10/1974 | Tsunoda et al. | 350/314 |
| 4,127,828 | 11/1978 | Klauminzer | 331/94.5 C |
| 4,143,937 | 3/1979 | Yonezawa et al. | 350/3.82 |

*Primary Examiner*—Bruce Y. Arnold
*Attorney, Agent, or Firm*—Arthur A. Smith, Jr.; James M. Smith

[57] ABSTRACT

The intensity profile of a beam of electromagnetic waves such as a laser beam is shaped by means of a diffraction grating and/or prism in the beam path. In one embodiment, beams exhibiting Gaussian energy intensity profiles undergo an energy redistribution to approximately uniform profiles. A reflective or transmissive surface relief grating is employed with phase steps generally periodic except at the pattern center where a pattern phase reversal occurs. Prisms are cut and oriented relative to the incoming beam to operate at the Brewster's angle for compressing or expanding the beam with minimum losses.

15 Claims, 17 Drawing Figures

METHOD AND APPARATUS FOR SHAPING ELECTROMAGNETIC BEAMS

GOVERNMENT SPONSORSHIP

The U.S. government has rights in this invention pursuant to contract number F 19(628)-80-C-0002 awarded by the Department of the Air Force, Electronics System Division.

TECHNICAL FIELD

This invention relates to methods of, and apparatus for, shaping the intensity profiles of laser and other electromagnetic beams. The invention has particular application in the generation of uniform intensity laser beam profiles in either one or two dimensions.

BACKGROUND

Coherent photon beams generated by lasers usually exhibit Gaussian, centrosymmetric, intensity distributions in their conventional modes. The Gaussian, or bell-shaped, intensity profile of such beams limits their effectiveness in many applications.

For example, laser beams are used to treat various workpieces by heat-hardening, annealing, or vaporizing portions of the piece. Because of the bell-shaped intensity profile, beam power must be carefully controlled to prevent destructive, over-treatment of the workpiece; only the central portion of the beam can be used effectively. Thus, the workpiece must be exposed to a large number of narrow scans, which are time and power consuming.

Similarly, Gaussian beam profiles limit the effectiveness of laser beam usage in thermomagnetic optical memory recording; a "flat-topped" beam optimizes the amount of laser power passing through an isotherm without exceeding the destructive threshold on a recording medium. Additionally, a uniform laser beam profile can greatly enhance the performance of laser amplifiers because when the input beam to a laser amplifier has a Gaussian profile, only the central, axial portion of the amplifying medium is effectively used. A uniform-profiled beam can use the entire cross-sectional area of the amplifying cavity.

Moreover, uniform intensity-profiled laser beams are advantageous in optical radars which use detector arrays. A uniform intensity transmission beam will produce a more effective, stronger and more uniform returning far-field signal.

Various attempts have been made to produce uniform intensity beams, particularly uniform intensity laser beams. One period method involves reflecting a Gaussian-distributed laser beam off an array of tiny mirrors arranged to introduce a dispersing effect at the beam center. The obvious disadvantage of this method is the loss of beam coherence in the far-field. Nonetheless, this apparatus is useful in near-field applications, but costly to manufacture.

Another means to achieve uniform intensity laser beams, known in the art, involves passing the beam through an energy absorbing filter having a radial variation in absorbency or polarization. Disadvantages of this method are that energy is wasted in the filter and heat-dissipating auxilliary equipment is often required. Such techniques are very difficult and expensive to implement for non-radially symmetric distributions, often do not preserve polarization, and section the laser beam.

Therefore, there exists a need for a simple, cost effective and energy efficient means to convert Gaussian profiled beams into uniform intensity beams. More generally, there is a need for such a means for shaping any electromagnetic wave beam to a desired intensity profile.

DISCLOSURE OF THE INVENTION

The intensity profile of a beam of electromagnetic waves is shaped by positioning a diffraction grating in the optical path of the beam. The physical parameters of the grating are selected to provide wave interference which results in a beam approximating a desired shape at a predetermined plane in the beam path. Preferably, the grating is a phase grating having a generally periodic surface relief pattern which provides a fractional wavelength path difference. The periodicity of the surface relief pattern is interrupted at a phase reversal of the pattern to provide both constructive and destructive interference of the diffraction beams.

The beam intensity profile, shaped by the diffraction grating, can then be compressed along one or two axes by at least one compression prism. This compression in the near field results in an expanded beam in the far field. When plural compression prisms are used, their orientations can be varied to change the expansion of the far field beam. With the prisms cut at the Brewster's angle losses are minimized.

In a specific example of the invention, I have discovered that a remarkable redistribution of beam energy, initially having a Gaussian profile, can be achieved without serious loss of useful power by employing a reflective or transmissive surface-relief grating to displace energy to the shoulders of the beam profile by constructive interference, while the tails of the beam profile are suppressed by destructive (out-of-phase) interference.

A specific embodiment of the invention comprises a binary grating surface with phase steps of constant height, h, chosen such that the incremental wavelength path difference is $\lambda/2$ or a fraction thereof, where $\lambda$ is the wavelength of the beam. The spacing of the binary phase steps is periodic except at the pattern center where a pattern phase reversal occurs. From this phase reversed grating only odd diffraction orders are generated, and each odd diffraction order is in turn split into two in-phase and (two $\pi$ radians) out-of-phase components. As a result of the relief grating, five different components make up the new beam, that is the zeroth diffraction order together with the split plus and minus first diffraction orders. This interference produces a good approximation of a "flat-topped" beam with intensity rolling off sharply at the beam shoulders.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead is placed upon illustrating the principles of the invention.

PREFERRED MODE OF THE INVENTION

Figure 1A:
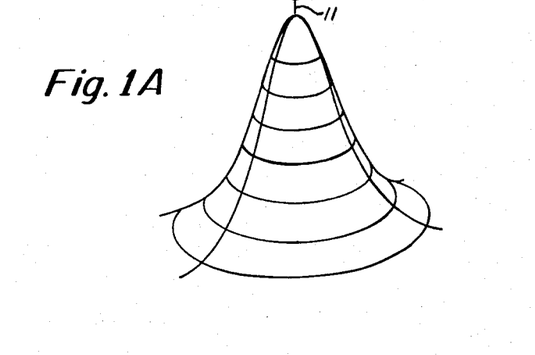
FIG. 1A is an illustration of a Gaussian laser intensity profile.
Figure 1B:
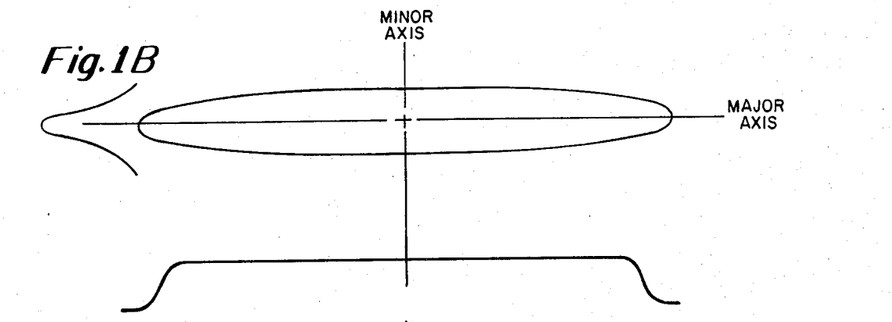
FIG. 1B illustrates one intensity profile of a laser beam which may be obtained using the principles of this invention, including the use of a diffraction grating and a two stage prism beam compressor.

Laser beams usually exhibit a Gaussian, centrosymmetric, intensity distribution such as shown in FIG. 1A where the arrow 11 indicates the optic axis and direction of the beam. It can be seen from FIG. 1A that the light is most intense along the optic axis and drops gradually toward the perimeter of the beam. In many applications, such as in laser radar in which light from a far field is returned to a linear array of detectors, the energy of the laser beam is more efficiently utilized by making the intensity of the beam more uniform across the beam and, in the case of the multiple detector radar, by stretching that beam. An example of a laser intensity profile having a shape which is preferred for use in radar and other applications is shown in FIG. 1B. That beam retains the Gaussian characteristics along the minor axis, that is perpendicular to the major axis, and has a uniform profile along the major axis of the beam.

Figures 1C, 1D:
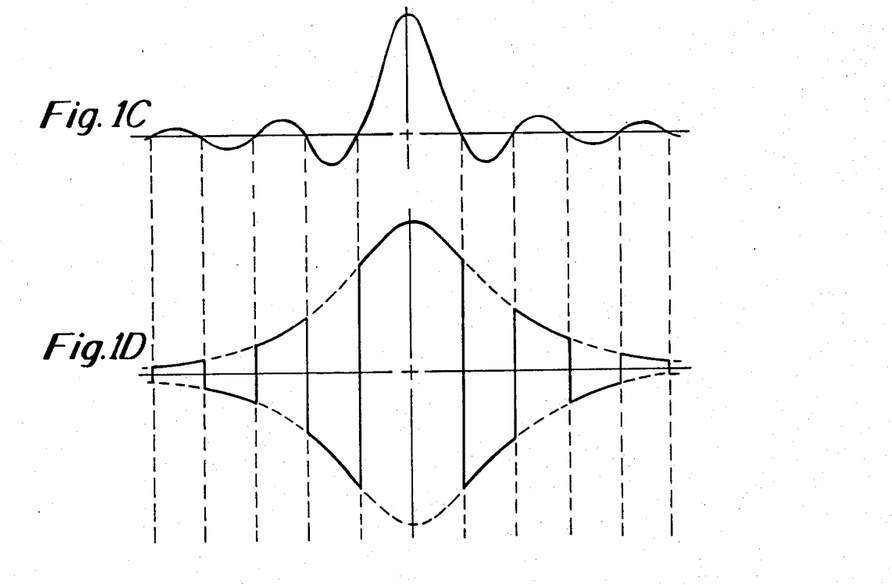
FIG. 1C illustrates an ideal near field amplitude profile the Fourier transform of which is the profile shown along the major axis of FIG. 1B.
FIG. 1D illustrates a characteristic near field amplitude profile obtained from a Gaussian beam by means of a binary grating to approximate the desired waveform of FIG. 1C.

To obtain a uniform beam at the far field, the beam at the near field, that is at the laser source, must be the inverse Fourier transform of the uniform beam. The proper near field beam must, therefore, approximate the sinc function shown in FIG. 1C. An approximation of the near field beam of FIG. 1C is obtained in accordance with this invention by means of a phase reversed diffraction grating. That grating, to be discussed in detail below, provides a characteristic near field amplitude profile shown in FIG. 1D.

Figure 2:
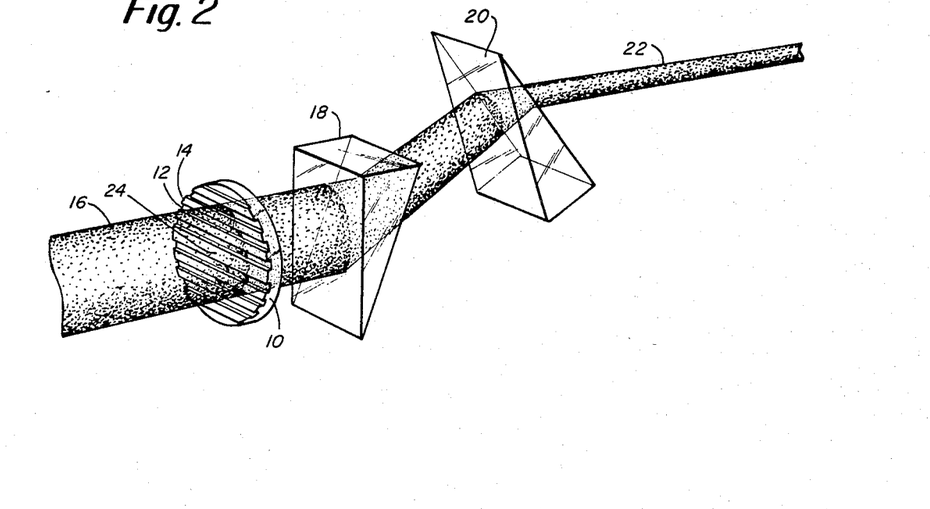
FIG. 2 is a schematic illustration of one embodiment of this invention including a diffraction grating used in conjunction with two anamorphic compression prisms.
Figure 3A:
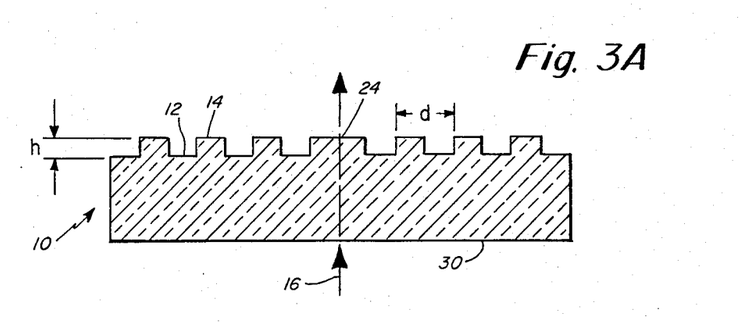
FIG. 3A is an enlarged cross-sectional view of a transmissive mode beam shaper embodying this invention.

The particular system which results in the beam of FIG. 1B in the far field is shown in FIG. 2. This system includes a surface relief grating 10 used in conjunction with a pair of anamorphic prisms 18, 20. As illustrated in FIG. 2 and in greater detail in FIG. 3A, this transmissive phase grating 10 comprises a plurality of binary phase steps 12, 14 with a phase reversal 24 at the center of the grating. As will be discussed below, this grating 10 shapes the intensity profile of the beam such that the beam in the far field (or focal plane) of the system is a "flat-topped" beam, that is one having a more uniform intensity across its diameter. In this application, it is also desired that the beam be stretched to provide the oblong beam of FIG. 1B. To that end, anamorphic prisms 18 and 20 are also provided.

Compression prisms, rather than lenses, are used advantageously in this system. By cutting each prism at the Brewster's angle and positioning each prism such that the incident radiation is normal to the front face of the prism, reflection losses due to the prisms can be minimized. The compression of the beam by each prism is equal to n, the refractive index of the prism material. The prism orientations can be adjusted for other than normal incidence of the beam to thus change the degree of compression. Such adjustment does result in increased losses, however, since the prisms no longer operate at the Brewster's angle. An even number of prisms assures that the input and output beams are colinear or nearly colinear.

Figure 3B:
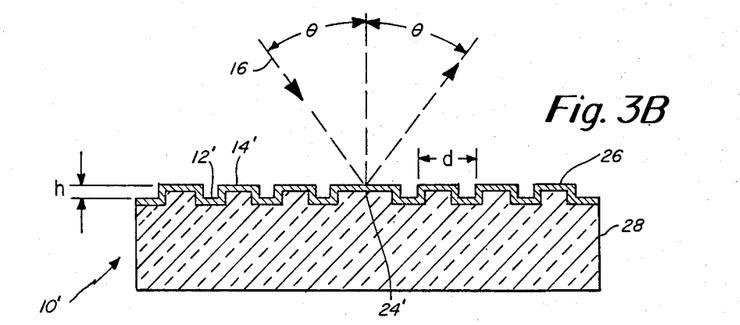
FIG. 3B is an enlarged cross-sectional view of a reflective mode beam shaper embodying this invention.

The grating 10 of FIG. 2 is a transmissive mode grating. As shown in FIG. 3B, the system may also be arranged to make use of a reflective mode grating 10'. In the reflective mode of FIG. 3B, the input beam is reflected off a stable binary relief pattern 26 coated with a highly reflective material such as gold or aluminum. The coating is deposited into an etched stable substrate 28 such as quartz. In the transmissive mode of FIG. 3A the input beam is transmitted through a transparent substrate 30 such as poly-gallium arsenide. The substrate 30 is etched with the binary relief pattern on its outer surface, and surfaces of the transmissive crystal are treated with an antireflection coating. The advantages of the reflective beam shaper are that it has less energy loss and that by rotating the substrate to change the angle of incidence $\theta$ the effective grating height can be changed dynamically to adjust the far field beam profile to the desired shape. The advantages of the transmissive beam shaper are that the input and output beams are colinear, and the shaper and a prism or lens can be combined into a single element.

Figure 4A:
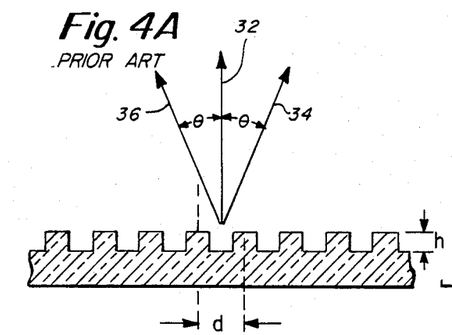
FIG. 4A is a cross-sectional view of a conventional phase grating illustrating the Bragg's diffraction angles.
Figure 4B:
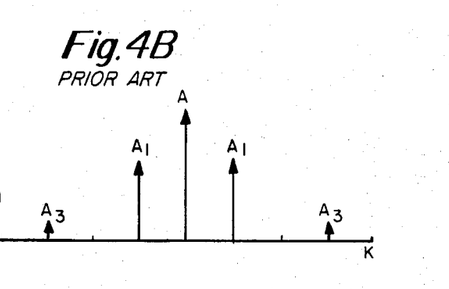
FIG. 4B is a dispersion plot illustrating the diffraction components and their phases produced by the grating of FIG. 4A.
Figure 5A:
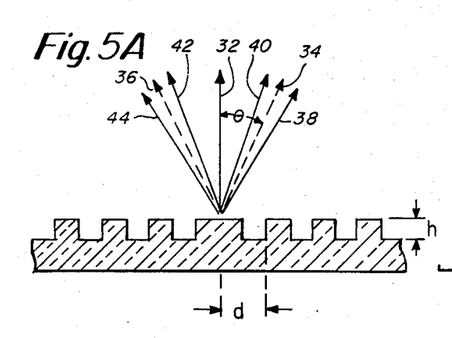
FIG. 5A is a cross-sectional view of a phase grating embodying this invention and illustrating the split in the first order diffraction beams.
Figure 5B:
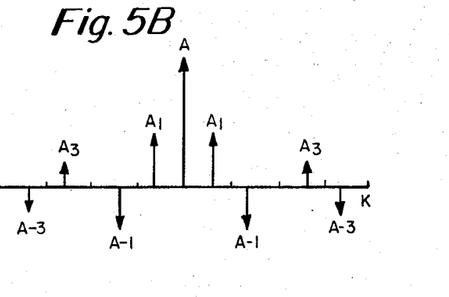
FIG. 5B is a dispersion plot illustrating the diffraction components and their phases produced by the grating of FIG. 5A.
Figure 6A:
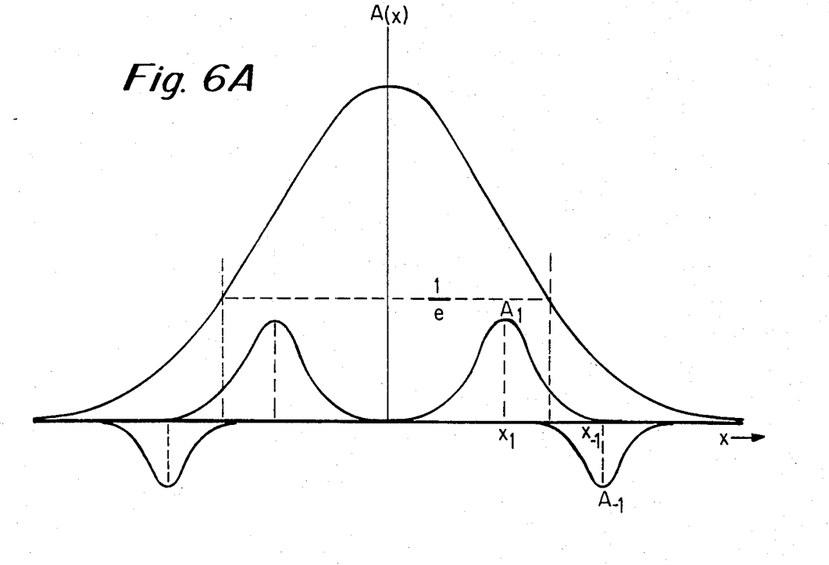
FIG. 6A is a composite beam profile of the zeroth and first order diffraction beams in the pattern of FIG. 5B.
Figure 6B:
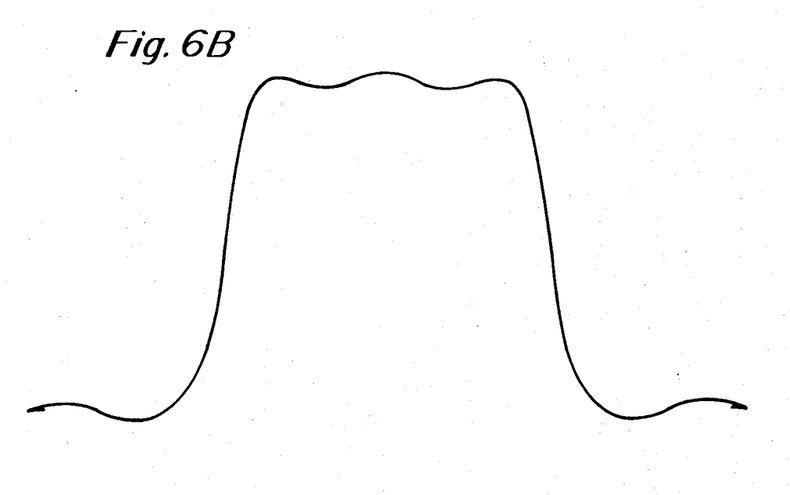
FIG. 6B is the beam profile resulting from the superposition of the composite beams of FIG. 6A.

The reshaping of the intensity profile of the laser beam by the grating 10 can be best understood with reference to FIGS. 4-6. FIG. 4A illustrates a conventional transmissive, binary phase grating. Some light which passes through the grating continues parallel to the optic axis 32 of the beam. Other light is diffracted over a discrete range of angles from the axis 32.

The binary steps delay the light which passes through those steps. Thus, if the step presents an optical path length equal to half the wavelength of the transmitted light, light which passes through the steps and which passes through the depressions in the grating is out of phase by $\pi$ radians. Thus, the light parallel to the axis 32 destructively interferes, and no beam is projected along the axis 32. If, however, the height h of the steps is such that the optical path length through a step is less than a half wavelength, the constructive interference of the light parallel to the axis 32 results in a zeroth order diffraction beam in that direction. Such a beam will be viewed at the center of the far field focal plane of the system and is illustrated by the vector A at the center of the graph of FIG. 4B.

Light which is diffracted by the plurality of steps in the grating at a specific angle $\theta$ from the optic axis 32 in the directions 34 and 36 constructively interferes at the far field or focal plane of the system and is thus visible as a diffraction beam at that plane. Those beams are illustrated by the vectors $A_1$ in FIG. 4B. As shown, at the far field or focal plane of the system those beams are displaced from the center beam A. Similarly, but to a lesser extent, light diffracted at specific larger diffraction angles constructively interferes. The second and third order diffraction beams are illustrated in FIG. 4B. Additional diffraction orders may also be visible but at lesser intensities. It should be noted that the dispersion plots of FIGS. 4B and 5B are for an ideal, infinite grating. Actually, the dispersion lines broaden and overlap.

By placing a $\pi$ phase shift in the surface relief pattern of the grating at the center of the grating, each of the odd order beams is split into two beams of interfering light at the far field. For example, the first order diffraction beam 30 transmitted in the direction 34 from the grating is split into two beams transmitted in the directions 38 and 40. Also, the first order beam transmitted in the direction 36 is split into two beams which are transmitted in the directions 42 and 44. Of the resultant four first order diffraction beams only two are in phase with the zeroth diffraction beam at the far field. These two beams, indicated as $A_1$ in FIG. 5B, constructively interfere with the beam A. The remaining two first order diffraction beams $A_{-1}$ are $\pi$ out of phase with the zeroth diffraction beam. As a result, any overlapping light from those beams is in destructive interference. This is illustrated by the composite beam profile of FIG. 6A.

Each diffraction beam profile forming the composite beam is Gaussian because the initial laser beam was Gaussian. As such, there is a maximum intensity at the center of each beam which reduces toward the perimeter of the beam. The first order diffraction beams $A_1$ are in constructive interference with the zeroth diffraction beam A and thus reinforce that beam in the region around the distance $X_1$ from the optic axis. The first order diffraction beams $A_{-1}$ are out of phase with the zeroth diffraction beam and thus destructively interfere with that beam. This reduces the intensity of light in the region around the distance $X_{-1}$ from the optic axis 32. The superposition of these diffraction beams is shown in FIG. 6B. It can be seen that the intensity of the beam is much more uniform and the perimeter of the beam is much more sharply defined than is the Gaussian profile of FIG. 1A.

The depth of the grating profile controls the relative contributions of the zeroth and subsequent order diffraction beams. In the case of a binary grating, that depth is the height h of the binary steps. Preferably h is such that the optical or wavelength path difference is less than or equal to $\lambda/2$. For the reflective mode, the height of the binary steps is defined by the following inequality:

$$0 < h \leq (\lambda/4) \cos \theta$$

where $\theta$ is the angle of incidence from normal. For the transmissive mode, the height of the binary steps is defined by the following inequality:

$$0 < h \leq \lambda/2n$$

where n is the refractive index of the substrate material.

In both modes, the phase reversal 24 or double width d of the step at the center of the phase grating serves to split the diffraction orders into four components: the two center ones are in phase with each other and $\pi$ radians out of phase with the two outer components. The energy is virtually confined to the lowest three diffraction orders, that is the zeroth and two first orders.

The grating periodicity, d, determines the extent to which the first order diffractions are split and the intensity of the split first order diffraction beam components. The grating periodicity is generally chosen such that $\sigma$, the ratio of d/w where w is the beam width chosen at the 1/e points of the profile, approaches unity. The choice of $\sigma$ is dependent on the divergence of the beam. Typically $\sigma$ ranges from 0.8 to 1.0. The ratio 95 = d/w controls the tradeoff between beam-profile flatness and the roll-off steepness at the edges of the profile.

Figure 7A:
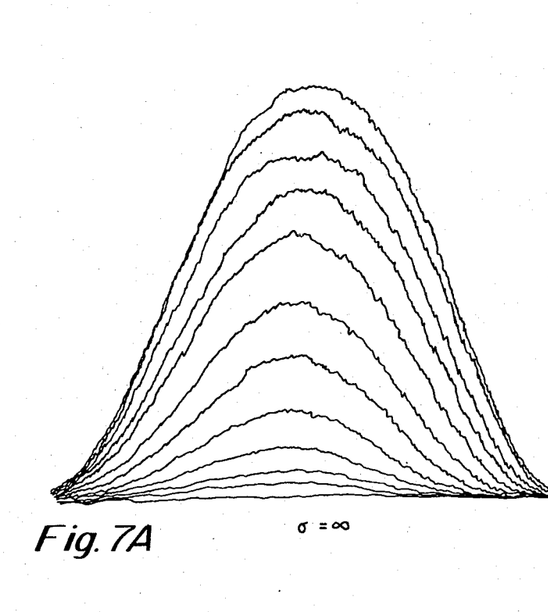
FIGS. 7A-7C are graphs from experimental data of actual beam cross-sectional profiles with and without shaping by the grating of FIG. 2.
Figure 7B:
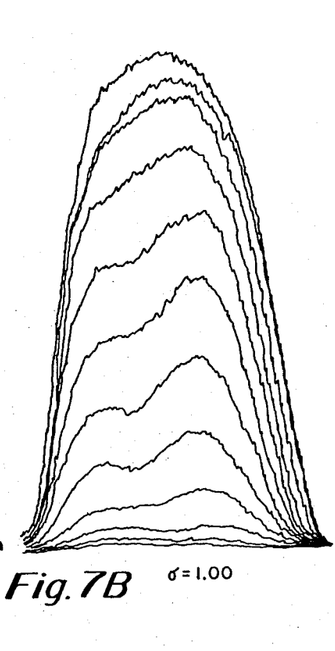
Figure 7C:
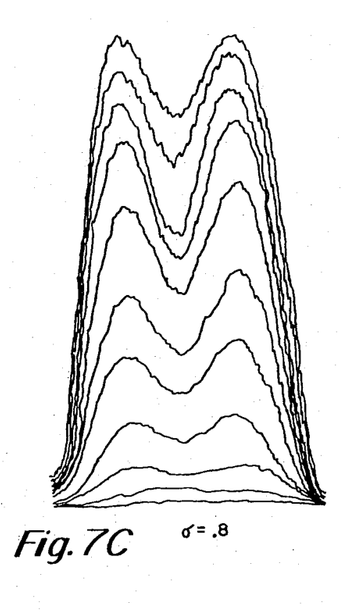

In FIGS. 7A–7C a comparison, using experimental data, is shown between an anamorphicly expanded beam without a grating in the optical path (FIG. 7A) and output beams for two different $\sigma$'s (FIGS. 7B and 7C) using a 10.6 micron $CO_2$ laser and a poly-GaAs (n=3.27) transmission mode beam shaper. A half-wavelength grating was used for this experiment. That is, $h = \lambda/2n$ and there was no resultant zeroth order diffraction beam. FIG. 7B shows the far-field intensity profile at $\sigma = 1.00$. Approximately 90 percent of the incident energy falls between the first "zero crossings" of the shaped profile. In FIG. 7C, where $\sigma = 0.80$, 78% of the incident energy is captured with steeper profile roll off, but some profile "flatness" is lost. It should also be noted that FIGS. 7B and 7C are profiles across the major axis of the beam that has undergone anamorphic expansion.

Figure 8:
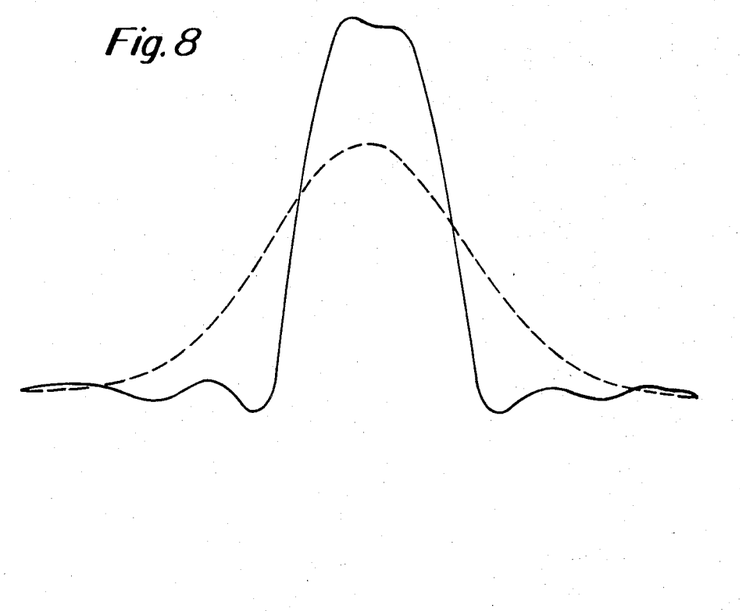
FIG. 8 is a plot of test data for another laser.

A test of another $CO_2$ laser provided the results of FIG. 8. The profile of a compressed beam which was not passed through the grating is shown in broken lines. The profile of a compressed beam shaped by the grating is shown in solid lines. In this case $\sigma$ equaled 0.9.

Both the reflective and transmissive modes can be fabricated using the same pattern mask. The surface relief pattern was produced by a computer-generated photographic mask copied in chrome, and the pattern was then contact printed onto a substrate coated with a thick layer of positive photoresist (AZ 135OJ). The exposed resist was developed away, the resulting binary relief pattern was ion-beam etched into a substrate to the required depth, and the surfaces were either anti-reflection coated or metal coated depending on the mode.

Thus far, the invention has been described with respect to a binary phase used to reshape a laser beam having a Gaussian intensity profile into one having a more uniform intensity profile. This basic technique of using a diffraction grating to thus reshape a beam can be extended both in its applications and in the apparatus.

The grating shown includes linear steps. The result is a beam having a more uniform profile along one axis but which remains Gaussian along an orthogonal axis. By providing circular concentric steps, the beam can be reshaped along both axes. Further, it is not necessary that a binary grating be utilized. For example, a sinusoidal surface relief pattern would only generate the zeroth and first diffraction order beams and would thus reduce degradation along the perimeter of the reshaped beam. Such gratings are more difficult to fabricate, however. Also, although the grating must be generally periodic and centrally symmetric, the period of the grating may very across the grating. Also, the depth of the pattern, whether binary, sinusoidal or some other configuration, need not be constant across the grating.

It should also be recognized that the grating surface need not to be on a separate optical element but may be on the laser window or on another optical element. Further, the grating need not be exposed to air but may be embedded in some material having a refractive index other than that of the grating substrate.

The invention also has significant potential in applications other than radar. For example, heat treatment of materials can be done more efficiently utilizing a beam which is reshaped in accordance with the principles of this invention. An example of such heat treatment is in the hardening of steel and cast iron machine parts now performed by lasers. Another example is the annealing of amorphous silicon into crystalline silicon and the annealing of semiconductor crystal lattice defects caused by ion bombardment of dopants. The system may also be used in the laser evaporation etching of microcircuitry. Moreover, the efficiency of laser amplifiers, active radar systems and thermomagnetic recording in optical memories can be improved.

The invention is not limited to laser systems. The technique of shaping electromagnetic beams by diffraction gratings has potential applications to electromagnetic beams of other wavelengths. Further, the invention is not limited to beams initially having a Gaussian profile and can be used to generate an infinite number of profiles.

While the invention has been particularly shown and described with reference to illustrative embodiments thereof, it will be understood by those skilled in the art that various changes in form and details may be made therein without departing from the spirit and scope of the invention as defined by the appended claims.

I claim:

1. A method of shaping the intensity profile of a beam of electromagnetic waves comprising:
positioning a diffraction grating having a centrally symmetric grating pattern in the optical path of the beam, the grating pattern itself having a generally central phase reversal transverse to the axis of the beam.

2. A method as claimed in claim 1 wherein the grating is a surface relief phase grating.

3. A method as claimed in claim 2 wherein the grating is a binary grating.

4. A method of shaping the intensity profile of an electromagnetic beam by reflecting said beam off, or transmitting said beam through, a surface relief grating, said grating having a coded surface relief pattern composed of many spaced binary phase steps of height h, where h is chosen to provide an incremental wavelength path difference related to the wavelength of the light in the laser beam whose intensity profile is shaped, the spacing between said spaced binary phase steps being periodic except at the surface relief pattern center where a surface relief pattern phase reversal occurs such that the center phase step has a width twice the width of other phase steps in the pattern, the periodicity of the binary phase steps being determined on the basis of the width, divergence and wavelength of the original beam and the required profile of the beam after processing by the grating.

5. A method as claimed in claim 1 or 4 further comprising positioning at least one beam compression prism in the optical path of the beam, each prism being cut and oriented relative to the incoming beam to operate at about the Brewster's angle.

6. A method as claimed in claim 1 or 4 wherein the grating is a reflective grating.

7. A method as claimed in claim 1 or 4 wherein the grating is a transmissive grating.

8. A method as claimed in claim 1 or 4 wherein the electromagnetic beam is a light beam.

9. A method as claimed in claim 8 wherein the light beam is generated by a laser and initially has a Gaussian intensity profile.

10. A method as claimed in claim 1 or 4 wherein the grating is a linear grating.

11. A method as claimed in claim 1 or 4 wherein a beam having a Gaussian intensity profile is reshaped to provide a beam having a more uniform intensity thereacross.

12. A method as claimed in claim 1 or 4 in which the beam having the reshaped intensity profile is used in a radar system.

13. A method as claimed in claim 1 or 4 in which the beam having the reshaped intensity profile is used in heat treatment of a material.

14. A method as claimed in claim 12 wherein the beam is used in annealing semiconductor material.

15. A method as claimed in claim 12 wherein the beam is used in the surface treatment of metals.

* * * * *